Nov. 5, 1957 R. TAYLOR 2,812,397
CURB PARKING SIGNAL
Filed Sept. 29, 1955
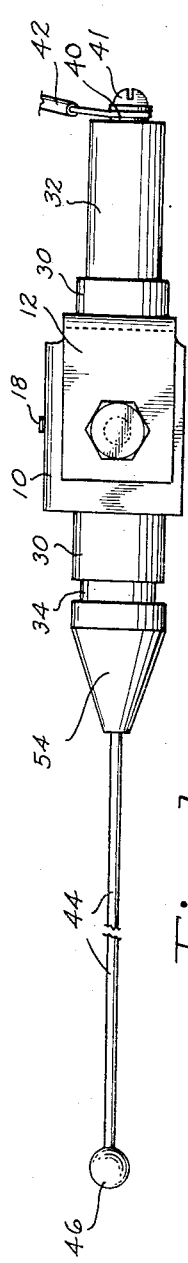
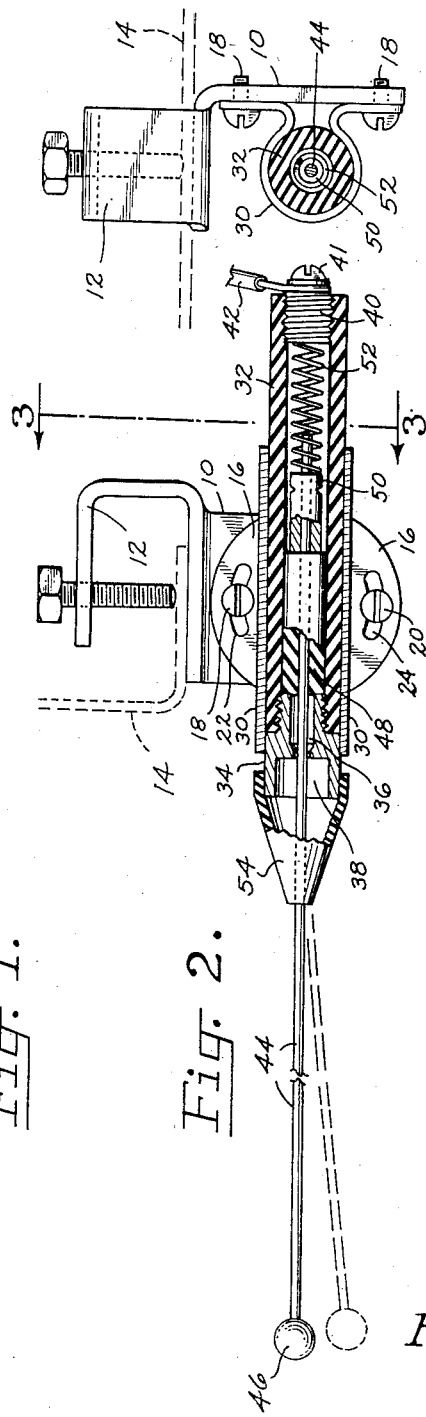
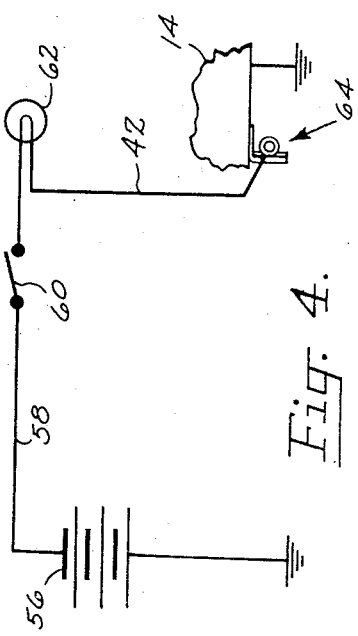
INVENTOR.
Robert Taylor
BY Eugene D. Farley
Atty.

United States Patent Office 2,812,397
Patented Nov. 5, 1957

2,812,397

CURB PARKING SIGNAL

Robert Taylor, Tacoma, Wash.

Application September 29, 1955, Serial No. 537,429

1 Claim. (Cl. 200—61.44)

This invention relates to curb parking signals of the class designed for mounting on vehicles to indicate to the driver the proximity of the vehicle to a curb, wall, or other obstruction.

It is the general object of the present invention to provide a highly sensitive curb parking signal for vehicles.

It is another object of this invention to provide a curb parking signal which may include a signal light mounted on the dashboard of the vehicle.

Still another object of this invention is the provision of a curb parking signal which is sealed efficiently against access of dirt into the inner mechanism, thereby prolonging the service life of the signal.

Still a further object of this invention is the provision of a curb parking signal which is operable irrespective of the direction of motion of the vehicle with respect to an obstacle.

Still another object of this invention is the provision of a curb parking signal wherein means are provided for absorbing thrust exerted against the contact element of the signal, thereby preventing damage to the same.

The manner in which the foregoing and other objects of this invention are accomplished will be apparent from the accompanying specification and claim considered together with the drawings, wherein:

Fig. 1 is a plan view of the herein described curb parking signal;

Fig. 2 is a longitudinal sectional view of the herein described curb parking signal;

Fig. 3 is a sectional view taken along line 3—3 of Fig. 2; and

Fig. 4 is a circuit diagram illustrating an electric circuit which may be used in conjunction with the herein described curb parking signal.

As is apparent from the drawings, the curb parking signal of this invention is mounted on a bracket 10 provided with a C-clamp 12 or other suitable means for mounting the signal on the fender 14 of an automobile or other vehicle. A base 16 is adjustably mounted on bracket 10 by means of bolts 18, 20 penetrating respectively arcuate slots 22, 24 in the base.

The signal mechanism is contained in a casing 30 which, like base 16 and bracket 10, is made of electrically conducting material and which may be formed integrally with base 16. The casing preferably is generally cylindrical in cross section. It contains a tube 32 made of hard rubber, plastic or other electrically non-conducting material.

A forward cap bolt 34 is threaded into the forward end of tube 32. This bolt is formed with an inner channel 36 which communicates with an outer recess 38 of substantial cross section.

A plug 40 is threaded into the rear end of tube 32. Like bolt 34, it is made of electrically conducting material. It is formed with a central longitudinal perforation into which a screw 41 is threaded. The latter screw serves as a terminal for electric wire 42, which leads to a source of electric current, for example, to the ignition switch of the vehicle.

Slidably mounted within tube 32 is the feeler arm 44. This arm is made of an electrically conducting material, and may have a contact ball 46 at its outer extremity.

A sleeve 48 is rigid to arm 44 intermediate its ends. This sleeve is made of insulating material and its cross section is dimensioned to fit snugly but slidably within the bore of tube 32.

A sleeve 50 also is rigid to the central portion of arm 44. It is located just behind sleeve 48 and unlike the former sleeve, is made of electrically conducting material. Accordingly, arm 44 is maintained extended outwardly from the assembly, spaced apart from the side walls of passageway 36 and cap bolt 34, and slidable in a longitudinal direction.

Means are provided for maintaining arm 44 resiliently in its extended position. In the illustrated form, such means comprise a compression spring 52 which encircles the shank of arm 44 and is interposed between the back surface of electrically conducting sleeve 50 and the forward surface of electrically conducting plug 40. Spring 52 normally urges arm 44 outwardly until non-conducting sleeve 48 abuts cap bolt 34. However, if the arm comes in contact with a solid object, it can yield slightly and accordingly will not be broken.

The operating parts of the signal are sealed against access of dirt. Thus the rear terminal portion of tube 32 is sealed off by screw 41 in plug 40. The forward terminal portion of the tube is sealed by means of cap bolt 34 in conjunction with a sealing member 54. This member is hollow and its forward end is dimensioned for snug engagement with arm 44 while its rearward portion is dimensioned to overlie and frictionally engage the end of cap bolt 34.

A suitable electric circuit for use in conjunction with the herein described signal is illustrated in Fig. 4. Electric current from a convenient source such as the vehicle battery 56 passes through wire 58 to the ignition switch 60. If this switch is closed, the current passes through an electrically operated device which preferably is an electric light 62 mounted on or adjacent the dashboard of the vehicle. It next passes through the herein described signal indicated generally by the numeral 64 in Fig. 4, mounted on the fender 14 of the vehicle. If the signal is in a position wherein the circuit is closed, electric light 62 will be energized and warning will be given that the vehicle is close to the curb or other obstacle.

Closure of the circuit through the signal is effectuated when arm 44 contacts the side wall of channel 36 through cap bolt 34. This occurs when the arm engages an obstacle and is bent to the dotted line position of Fig. 2. Electric current then can flow through line 42, plug 40, spring 52, sleeve 50, arm 44, cap bolt 34, casing 30, bracket 10 and thence to ground through the fender 14 of the vehicle. The proximity of the vehicle to an obstacle thus is indicated to the driver by means of light 62.

It will be apparent that if desired two of the signals described herein may be mounted on the vehicle, one at the front and one at the back to facilitate further its operation.

Having thus described my invention in preferred embodiments, I claim as new and desire to protect by Letters Patent:

A curb parking signal comprising an elongated tube of electrically non-conductive material, an electrically conductive longitudinally perforated cap bolt on the forward end of the tube, an electrically conductive plug on the rearward end of the tube, an electrically conductive laterally resilient feeler arm extending freely through the perforation in the cap bolt and into the tube, an electrically conductive abutment secured to the arm within the tube between the cap bolt and plug, an electrically conductive spring interengaging the plug and abutment and normally urging the latter and said arm forwardly, an electrically non-conductive bearing for the arm within the tube between the abutment and cap bolt for separating said abutment and cap bolt electrically and for supporting the feeler arm normally out of contact with the cap bolt, the arm being movable laterally into contact with the cap bolt upon contact of the arm with an obstacle, and means for connecting the plug and cap bolt in series in an electric circuit.

References Cited in the file of this patent

UNITED STATES PATENTS

| | | |
|---|---|---|
| 2,214,685 | Stone | Sept. 10, 1940 |
| 2,302,283 | Yarnall | Nov. 17, 1942 |
| 2,482,630 | Mastromarino | Sept. 20, 1949 |
| 2,592,742 | Rose | Apr. 15, 1952 |